(12) United States Patent
Hicks

(10) Patent No.: US 8,583,373 B2
(45) Date of Patent: Nov. 12, 2013

(54) METHODS AND APPARATUSES FOR PROVIDING ENHANCED NAVIGATION SERVICES

(75) Inventor: Mary Anne Hicks, San Antonio, TX (US)

(73) Assignee: AT&T Services, Inc., San Antonio, TX (US)

( * ) Notice: Subject to any disclaimer, the term of this patent is extended or adjusted under 35 U.S.C. 154(b) by 385 days.

(21) Appl. No.: 12/272,244

(22) Filed: Nov. 17, 2008

(65) Prior Publication Data

US 2010/0125410 A1 May 20, 2010

(51) Int. Cl.
*G01C 21/00* (2006.01)
(52) U.S. Cl.
USPC .......................................... 701/533; 701/117
(58) Field of Classification Search
USPC ......... 701/209, 201, 208, 117, 200, 207, 211, 701/426, 533, 428; 704/4; 455/414.2, 439, 455/557; 340/539.13, 539.1; 342/357.31
See application file for complete search history.

(56) References Cited

U.S. PATENT DOCUMENTS

| | | | |
|---|---|---|---|
| 7,429,919 B2 * | 9/2008 | Silic et al. | 340/539.1 |
| 7,555,433 B2 * | 6/2009 | Otani | 704/277 |
| 7,571,048 B2 * | 8/2009 | Komatsu | 701/201 |
| 7,623,959 B2 * | 11/2009 | Lee et al. | 701/200 |
| 7,876,205 B2 * | 1/2011 | Catten et al. | 340/439 |
| 2003/0202683 A1 * | 10/2003 | Ma et al. | 382/104 |
| 2004/0158395 A1 * | 8/2004 | Yamada et al. | 701/202 |
| 2005/0266879 A1 * | 12/2005 | Spaur et al. | 455/556.2 |
| 2006/0022841 A1 * | 2/2006 | Hoiness et al. | 340/870.02 |
| 2007/0041552 A1 * | 2/2007 | Moscato | 379/214.01 |
| 2007/0123280 A1 * | 5/2007 | McGary et al. | 455/466 |
| 2007/0237318 A1 * | 10/2007 | McGary | 379/114.15 |
| 2008/0004021 A1 * | 1/2008 | Sanjay | 455/436 |
| 2008/0033635 A1 * | 2/2008 | Obradovich et al. | 701/201 |
| 2008/0243374 A1 * | 10/2008 | Hatazawa | 701/208 |
| 2008/0284587 A1 * | 11/2008 | Saigh et al. | 340/539.13 |
| 2009/0077100 A1 * | 3/2009 | Hancock et al. | 707/10 |
| 2009/0164110 A1 * | 6/2009 | Basir | 701/117 |
| 2009/0174572 A1 * | 7/2009 | Smith | 340/902 |
| 2009/0298482 A1 * | 12/2009 | Yen et al. | 455/414.2 |
| 2010/0023246 A1 * | 1/2010 | Zhao et al. | 701/117 |
| 2010/0030549 A1 * | 2/2010 | Lee et al. | 704/4 |
| 2010/0056183 A1 * | 3/2010 | Oh | 455/456.3 |
| 2010/0216509 A1 * | 8/2010 | Riemer et al. | 455/557 |
| 2011/0010241 A1 * | 1/2011 | Mays | 705/14.49 |
| 2011/0028121 A1 * | 2/2011 | Sennett et al. | 455/404.1 |

* cited by examiner

*Primary Examiner* — Marthe Marc-Coleman
(74) *Attorney, Agent, or Firm* — Parks IP Law LLC; Mickki D. Murray, Esq.

(57) ABSTRACT

Systems and methods for providing enhanced navigation services are disclosed. A navigation system can include a memory, a processor, and a location determination device. The navigation system can receive data that indicates the location of a device. The navigation system can generate notifications for the device. The navigation system can interrupt communications at the device to provide notifications, if desired. Methods for providing notifications during enhanced navigation sessions also are disclosed.

26 Claims, 7 Drawing Sheets

METHODS AND APPARATUSES FOR
PROVIDING ENHANCED NAVIGATION
SERVICES

TECHNICAL FIELD

The present disclosure relates generally to navigation and, more particularly, to methods and apparatuses for providing enhanced navigation services.

BACKGROUND

The global positioning system (GPS) was created by the U.S. Department of Defense. In 1983, Korean Air Lines Flight 007 was shot down by the USSR after the flight strayed into the USSR's airspace. In response, U.S. President Ronald Reagan issued a directive making GPS available for civilian use. Since President Reagan's directive was issued, portable navigation devices have become popular tools. Additionally, the number of cellular telephone users worldwide has skyrocketed. Some estimates put the number of cellular subscribers in the United States at over 275 million. An increasing number of mobile devices such as cellular telephone devices include rudimentary navigation services, in addition to traditional voice services and data services. As such, it is possible for many mobile subscribers to use some navigation features provided by a mobile device.

Unlike GPS-based navigation devices, mobile devices do not necessarily rely solely upon GPS to provide navigation services. Some mobile devices use A-GPS, location beacons, recognized network access points, and the like, to determine location and to provide location based services such as navigation. As such, mobile devices can provide navigation services in areas and locations at which a traditional GPS-based navigation device may be unusable.

SUMMARY

An embodiment of the present disclosure is directed to a system for providing enhanced navigation service information to a mobile device. The system includes a processor, a location determination device, and a memory. The memory can be in communication with the processor and a location determination device. Furthermore, the memory can be configured to store instructions. The instructions are executable by the processor to make the system operable to access maps and navigation information to calculate a navigation route including an origin and a destination. The system can also use received data indicating a position of the mobile device based, at least partially, upon location information generated by the location determination device. The system can generate a notification when the position and the destination are within a turn proximity. The system can interrupt communications at the mobile device to provide the notification.

In some embodiments, the system includes instructions, executable by the processor to make the system operable to determine that the mobile device is engaged in communications with an external device, and to generate instructions for the communications at the mobile device to be interrupted to provide the notification.

In some embodiments, the notification can include navigation information translated from a first language to a second language. In some embodiments, notification can include a pronunciation key indicating pronunciation of the navigation information. The location determination device can be, for example, a location component of the mobile device, a location server of a communications network, a location beacon, or another location determination device.

In some embodiments, the maps and navigation information can include data indicating routes, schedules, and transit times for at least one public transit vehicle. The maps and navigation information can also include a route for at least one utility, for example, a utility easement. The maps and navigation information can also include data relating to a bicycle path, a hiking trail, and/or a public park.

Another embodiment of the present disclosure is directed to a method for providing a notification to a mobile device providing enhanced navigation services. The method can include receiving data indicating an origin and a destination, accessing maps and navigation information to calculate a navigation route including the origin and the destination, and receiving data indicating a position of the mobile device based, at least partially, upon location information generated by the location determination device. The method can also include recognizing that the mobile device is approaching a turn by recognizing that the mobile device is within a turn proximity, determining a format for the notification, generating the notification, and interrupting communications at the mobile device to provide the notification.

In some embodiments, the method includes determining that the mobile device is engaged in communications with another or remote device, and determining if communications at the mobile device should be interrupted to provide a notification. In some embodiments, the notification can include navigation information translated from a first language to a second language. In some embodiments, the notification further includes a pronunciation key indicating pronunciation of the navigation information. In some embodiments, generating the notification includes generating a visual notification, generating an audio notification, and/or generating a tactile notification. The method can also include transmitting the notification to one or more components of the mobile device.

Another embodiment of the present disclosure is directed to a mobile device configured for cellular communications over a cellular network and configured for providing enhanced navigation services. The mobile device can include a processor, a location determination device, and a memory in communication with the processor and the location determination device. The memory can be configured to store instructions. The instructions, when executed by the processor, can make the mobile device operable to access maps and navigation information to calculate a navigation route including an origin and a destination, and to acquire data indicating a position of the mobile device. The instructions can, upon execution by the processor, make the mobile device operable to generate a notification when the position and the destination are within a turn proximity, and receive instructions to interrupt communications at the mobile device to provide the notification.

In some embodiments, the mobile device further includes instructions, executable by the processor to make the mobile device operable to determine that the mobile device is engaged in communications with an external device, and generate instructions for the communications at the mobile device to be interrupted to provide the notification.

In some embodiments, the mobile device further includes instructions, executable by the processor to make the mobile device operable to include, in the notification, navigation information translated from a first language to a second language. In some embodiments, the mobile device further includes instructions, executable by the processor to make the mobile device operable to include, in the notification, a pronunciation key indicating pronunciation of the navigation information.

In some embodiments, the location determination device includes a GPS receiver of the mobile device or a location server of a cellular network. In some embodiments, the instructions for accessing maps and navigation information further include instructions, executable by the processor to make the mobile device operable to access maps and navigation information including data indicating routes, schedules, and transit times for at least one public transit vehicle. The maps and navigation information can also include data indicating at least one selected from a group including public transit routes, public transit schedules, bicycle paths, hiking trails, public parks, and utility easements.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
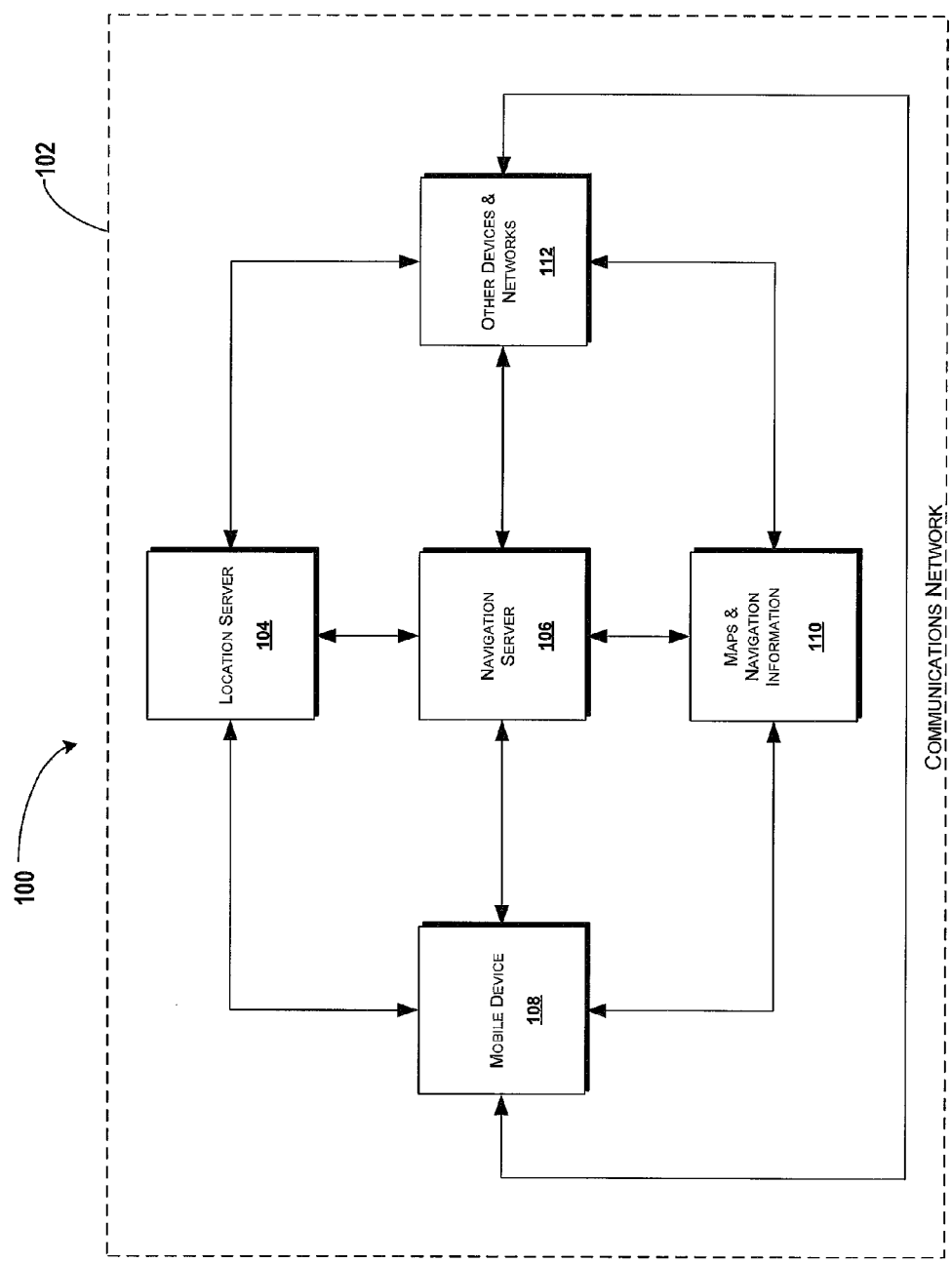
FIG. 1 schematically illustrates a system for providing enhanced navigation services, according to an exemplary embodiment of the present disclosure.

Referring now to the drawings in which like numerals represent like elements throughout the several views, FIG. 1 schematically illustrates a system 100 for providing enhanced navigation services, according to an exemplary embodiment of the present disclosure. The system 100 can include a communications network 102. The communications network 102 can include a cellular network, a packet data network, for example, the Internet (Internet), a circuit switched network, for example, a publicly switched telephone network (PSTN), and/or other networks and devices.

The cellular network can include various components such as, but not limited to, base transceiver stations (BTS's), Node-B's, base station controllers (BSC's), radio network controllers (RNC's), mobile switching centers (MSC's), short message service centers (SMSC's), multimedia messaging service centers (MMSC's), home location registers (HLR's), visitor location registers (VLR's), charging platforms, billing platforms, voicemail platforms, GPRS core network components, location service nodes, Internet protocol multimedia subsystem (IMS), and the like. The cellular network also can include radios and nodes for receiving and transmitting voice, data, and combinations thereof to and from radio transceivers, networks, and the Internet.

The cellular network can be configured as a 2G GSM (Global System for Mobile communications) network, and can provide data communications via GPRS (General Packet Radio Service) and EDGE (Enhanced Data rates for GSM Evolution). Additionally, the cellular network can be configured as a 3G UMTS (Universal Mobile Telecommunications System) network and can provide data communications via the HSPA (High-Speed Packet Access) protocol family, for example, HSDPA (High-Speed Downlink Packet Access), EUL (Enhanced Uplink) or otherwise termed HSUPA (High-Speed Uplink Packet Access), and HSPA+(Evolved HSPA). The cellular network is also compatible with future mobile communications standards including, but not limited to, pre-4G and 4G, for example.

It should be appreciated that substantially all of the functionality described with reference to the communications network 102 can be performed by the cellular network alone, or in combination with other networks, network elements, and the like, and that some elements are not illustrated.

The communications network 102 also can include a location server 104. In some embodiments, the location server 104 includes one or more nodes that reside on a cellular network. In some embodiments, the location server 104 determines and reports the location of a device in communication with the communications network 102. In some embodiments, a device in communication with the communications network 102 determines its location, and the device communicates the location to the location server 104. For example, the device can determine its location using GPS or other location services, for example, and communicate location information to the location server 104 upon determination, at various intervals, upon occurrence of trigger events, upon requests, or the like. By way of another example, the location server 104 can use network elements to determine the location of a device. In some embodiments, for example, the location server 104 uses network elements to determine location of the device using triangulation of network signals, for example.

The communications network also can include a navigation server 106. The navigation server 106 can use the location information received from the location server 104 to determine, format, and communicate directions for a device operating on the communications network 102, for example, the device 108. As explained above, the device 108 can determine its location using, for example, GPS, and can provide its location to the location server 104 and/or the navigation server 106.

The communications network 102 also can include one or more maps and navigation information nodes 110 (MNN). The MNN 110 can store maps and navigation information for use by the navigation server 106, the device 108, or both. In some embodiments, the MNN 110 is a web server that is accessible by the navigation server 106 and/or the device 108, as well as other devices. In some embodiments, the MNN 110 is a memory associated with the navigation server 106, the device 108, or another device.

The MNN 110 can store maps for streets, roads, paths, bicycle paths, hiking trails, walkways, utility easements and/or routes, subway routes, train routes, bus routes, taxi routes, shuttle routes, airplane routes, rapid transit routes, ferry routes, waterways, combinations thereof, and the like. As such, the MNN 110 can provide navigation information that makes use of numerous modes of transportation including, for example, walking, bicycling, driving, boating, flying, and rapid transit, for example, as will be explained in more detail below.

As illustrated, the location server 104, the navigation server 106, the device 108, and/or the MNN 110 can be in communication with other devices and networks 112. The other devices and networks 112 can be devices and networks in communication with, or existing on, the communications network 102, and can include, for example, GPS networks, location beacons, billing modules, translation modules, map and navigation information update servers, combinations thereof, and the like.

Figure 2:
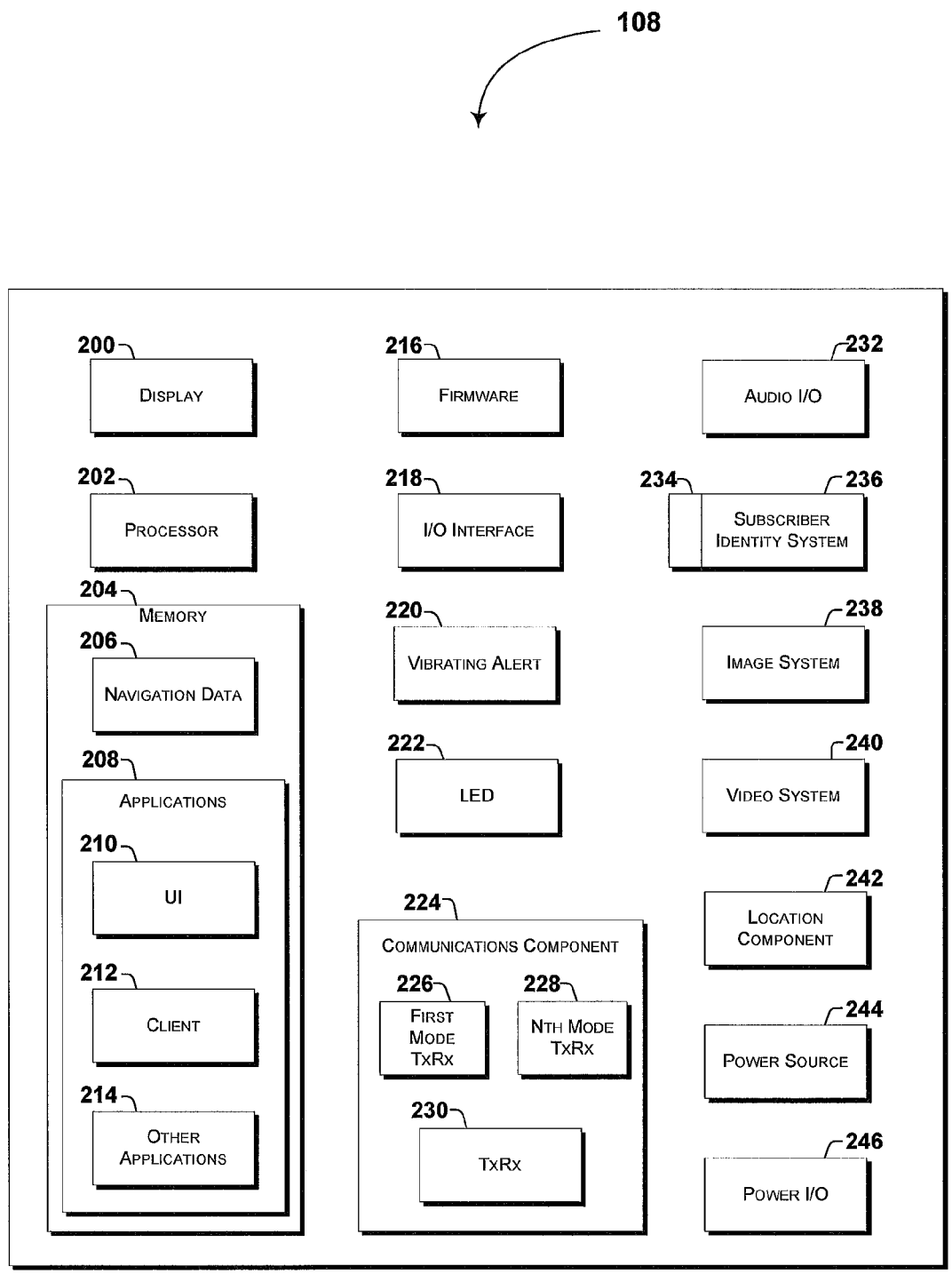
FIG. 2 schematically illustrates an exemplary device with which embodiments of the present disclosure can be implemented, according to an exemplary embodiment of the present disclosure.

FIG. 2 illustrates a schematic block diagram of an exemplary device 108 for use in accordance with some exemplary embodiments of the present disclosure. Although no connections are shown between the components illustrated in FIG. 2, the components can interact with each other to carry out functions of the device 108.

It should be understood that FIG. 2 and the following description are intended to provide a brief, general description of a suitable environment in which the various aspects of some embodiments of the present disclosure can be implemented. While the description includes a general context of computer-executable instructions, the present disclosure also can be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, handheld computing devices, microprocessor-based, programmable consumer electronics, combinations thereof, and the like.

The device 108 can be a multimode headset, and can include a variety of computer readable media, including volatile media, non-volatile media, removable media, and non-removable media. The term "computer-readable media" and variants thereof, as used in the specification and claims, can include storage media and communication media. Storage media can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 108.

The device 108 can include a display 200 for displaying multimedia such as, for example, text, images, video, telephony functions such as Caller ID data, setup functions, menus, music, metadata, messages, wallpaper, graphics, Internet content, advertisements, device status, preferences settings, map data, navigation data, location data, and the like.

The device 108 can include a processor 202 for controlling, executing, and/or processing data. A memory 204 can interface with the processor 202, and can store data. The data stored by the memory 204 can include, for example, navigation data 206 and applications 208.

The navigation data 206 can include, for example, map and navigation data and information, rapid transit schedule and route information, foreign language dictionaries and translation modules, address lists, notification preferences and settings, combinations thereof, and the like. As explained briefly above, if the system 100 operates on the device 108, the navigation data 206 of the device 108 can provide the functionality of the MNN 110, if desired. Alternatively, the device 108 can access the MNN 110 instead of, or in addition to, the navigation data 206.

An application 208 can include, for example, navigation applications, web browsing software, text input software, mapping software, audio player software, video playback software, voicemail software, audio playback software, music player software, email software, messaging software, combinations thereof, and the like. The applications 208 also can include a user interface (UI) application 210. The UI application 210 can interface with a client 212 (e.g., an operating system) to facilitate user interaction with device functionality and data, for example, answering/initiating calls, accepting/outputting navigation data, entering/deleting data, configuring settings, address book manipulation, multimode interaction, and the like. The applications 208 also can include other applications 214 such as, for example, firmware, navigation software, visual voicemail software, add-ons, plug-ins, voice processing, voice recording, messaging, e-mail processing, video processing, image processing, archival applications, music playback, combinations thereof, and the like, as well as subsystems and/or components. The applications 208 can be stored in the memory 204 and/or in a firmware 216 as executable instructions, and can be executed by the processor 202. The firmware 216 also can store code for execution during initialization of the device 108.

An input/output (I/O) interface 218 can be provided for input/output of data and/or signals. The I/O interface 218 can be a hardwire connection, such as, for example, a USB port, a mini-USB port, an audio jack, a PS2 port, an IEEE 1394 port, a serial port, a parallel port, an Ethernet (RJ48) port, a telephone (RJ11) port, and the like, and can accept other I/O devices such as, for example, keyboards, keypads, mice, interface tethers, stylus pens, printers, thumb drives, touch screens, multi-touch screens, touch pads, trackballs, joy sticks, microphones, remote control devices, monitors, displays, liquid crystal displays (LCD's), combinations thereof, and the like. It should be appreciated that the I/O interface 218 can be used for communications between the device and a network or local device.

The device 108 can include a vibrating alert 220 for providing a vibration alert function for the device 108. The device 108 also can include one or more light emitting diodes 222 (LED's) for providing device status information, visual alerts, warnings, and the like.

A communications component 224 can interface with the processor 202 to facilitate wired/wireless communications with external systems including, for example, cellular networks, location systems, VoIP networks, local area networks (LAN's), wide area networks (WAN's), metropolitan area networks (MAN's), personal area networks (PAN's), and other networks, which can be implemented using WIFI®, WIMAX™, combinations and/or improvements thereof, and the like. The communications component 224 can be used instead of, or in addition to, the I/O interface 218. The communications component 224 also can include a multimode communications subsystem for providing cellular communications via different cellular technologies.

For example, a first cellular transceiver 226 can operate in one mode, for example, GSM, and an Nth transceiver 228 can operate in a different mode, for example UMTS. Although only two transceivers 226, 228 are illustrated, it should be appreciated that more than two transceivers can be included in the device 108. The communications component 224 also can include a transceiver 230 for unlicensed communications using technology such as, for example, WIFI®, WIMAX™, BLUETOOTH®), infrared, infrared data association (IRDA), near field communications (NFC), other radio frequency (RF) applications, and the like. The communications component 224 also can facilitate communications reception from terrestrial radio networks, digital satellite radio networks, Internet-based radio services networks, combinations thereof, and the like. The communications component 224 can process data from a network such as, for example, the Internet, a corporate intranet, a home broadband network, and the like, via an internet service provider (ISP), a digital subscriber line (DSL) provider, a cable provider, and/or a broadband provider.

Audio capabilities can be provided by an audio I/O component 232 that can include a speaker for the output of audio signals and a microphone to collect audio signals. The audio I/O component 232 can include more than one speaker, including, for example, an earpiece speaker, a loudspeaker, a ringer, and the like. The device 108 can include a slot interface 234 for accommodating a subscriber identity system 236 such as, for example, a SIM or universal SIM (USIM). The subscriber identity system 236 instead can be manufactured into the device 108, thereby obviating the need for a slot interface 234. In some embodiments, the subscriber identity system 236 can store certain features, account information, user information, rules, policies, models, and the like. The subscriber identity system 236 can be programmed by a manufacturer, a retailer, a customer, a network operator, and the like.

The device 108 can include an image capture and processing system 238 (image system). Photos and/or videos can be obtained via an associated image capture subsystem of the image system 238, for example, a camera. The device 108 also can include a video system 240 for capturing and recording video content. The video system 240 can provide video data to various applications 208, such as, for example, video teleconferencing applications, video compression applications, video messaging applications, video sharing applications, and the like.

A location component 242, can be included to send and/or receive signals such as, for example, GPS data, A-GPS data, WIFI®, WIMAX™, cellular network triangulation data, and/ or combinations thereof, and the like. The location component 242 can interface with cellular network nodes, telephone lines, satellites, location transmitters and/or beacons, wireless network transmitters and receivers, for example, WIFI® hotspots, radio transmitters, combinations thereof, and the like. In some embodiments, the location component 242 interfaces with a location server 104 of a cellular network, for example. The device 108 can obtain, generate, and/or receive data to identify its location, or can transmit data used by other devices to determine the device 108 location. The device 108 can include a power source 244 such as batteries and/or other power subsystems (AC or DC). The power source 244 can interface with an external power system or charging equipment via a power I/O component 246.

Figure 3:
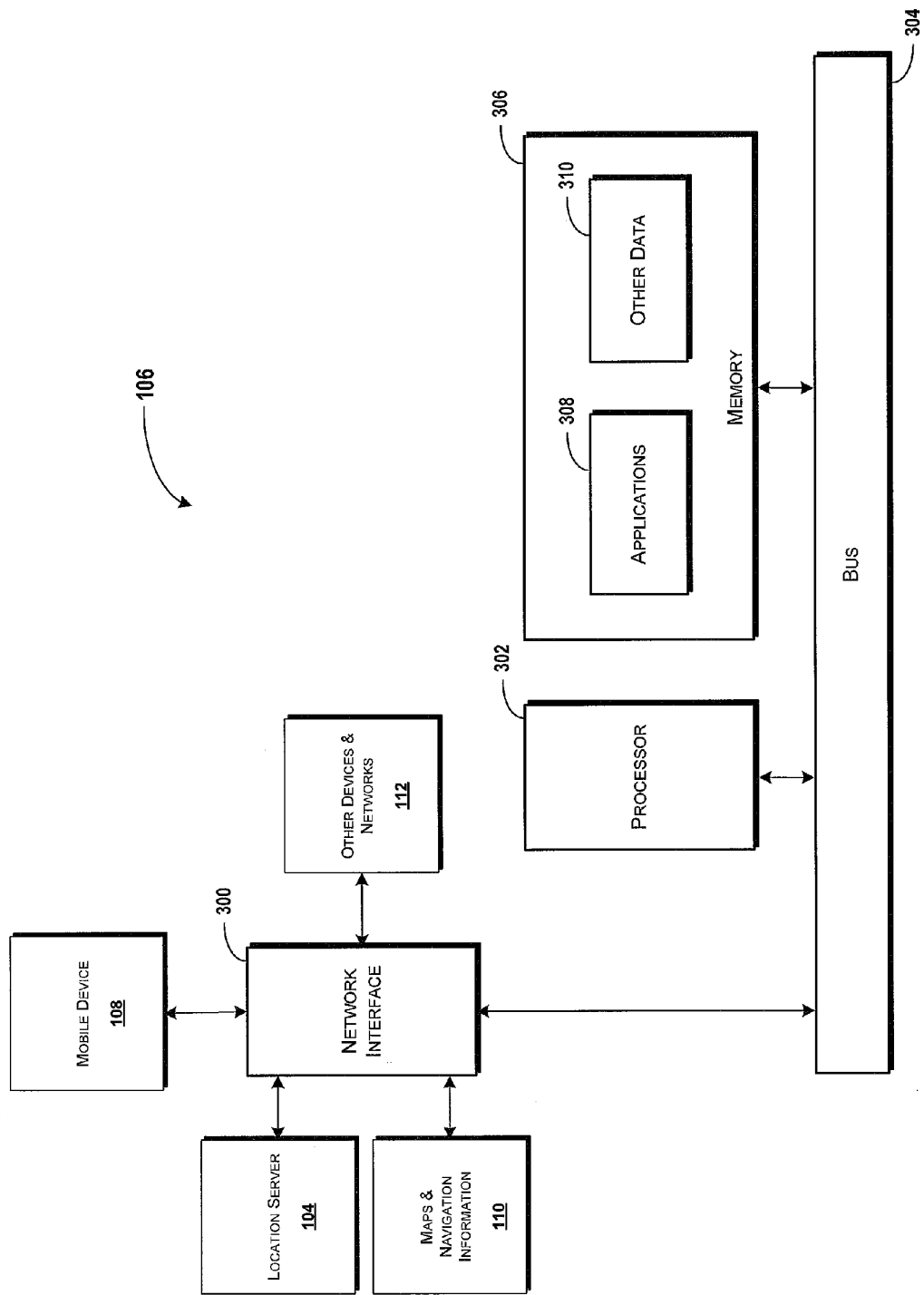
FIG. 3 schematically illustrates a navigation server for providing enhanced navigation services, according to an exemplary embodiment of the present disclosure.

FIG. 3 schematically illustrates a block diagram of a navigation server 106 according to an exemplary embodiment of the present disclosure. The navigation server 106 can be a combination of hardware and software, and can exist as a node on a communications network 102, as explained above with reference to FIG. 1. Additionally, or alternatively, the functionality of the navigation server 106 can be provided by one or more hardware and/or software modules on a device, for example, the illustrated device 108.

The illustrated navigation server 106 includes one or more network interfaces 300 that are operatively linked and in communication with one or more processors 302 via one or more data/memory busses 304. The network interface 300 can be used to allow the navigation server 106 to communicate with the location server 104, the device 108, the MNN 110, and/or the other devices and networks 112, including various additional and/or alternative components of the communications network 102, and/or any device connected thereto or residing thereon. The processor 302 is operatively linked and in communication with one or more memory devices 306 via the data/memory bus 304.

The word "memory," as used herein to describe the memory 306, collectively includes all memory types associated with the navigation server 106 such as, but not limited to, processor registers, processor cache, random access memory (RAM), other volatile memory forms, and non-volatile, semi-permanent or permanent memory types; for example, tape-based media, optical media, flash media, hard disks, combinations thereof, and the like. While the memory 306 is illustrated as residing proximate the processor 302, it should be understood that the memory 306 can be a remotely accessed storage system, for example, a server and/or database on the communications network 102, a remote hard disk drive, a removable storage medium, combinations thereof, and the like. Moreover, the memory 306 is intended to encompass network memory and/or other storage devices in wired or wireless communication with the navigation server 106, which may utilize the network interface 300 to facilitate such communication. Thus, any of the data, applications, and/or software described below can be stored within the memory 306 and/or accessed via network connections to other data processing systems (not shown) that may include a local area network (LAN), a metropolitan area network (MAN), or a wide area network (WAN), for example.

Accordingly, concepts of the present disclosure may operate on the navigation server 106, wherein the navigation server 106 is configured as a server to one or more client data processing systems as dictated by a client/server model. It should be appreciated that the memory 306 also can be a storage device associated with the device 108, as explained above. The illustrated memory 306 can include one or more applications 308 and/or other data 310.

The applications 308 can include various programs, routines, subroutines, algorithms, software, tools, and the like ("instructions"), for providing navigation information to a user of the device 108. For example, the applications 308 can be used to recognize data received from the location server 104 or the device 108 as the location of the device 108. A navigation application can use destination information and location information to determine navigation information to pass to a user of the device 108. As such, the navigation server 106 can access maps and navigation information stored at the MNN 110, for example. These and other functions of the navigation server 106 will be described in more detail below with reference to FIGS. 4-7.

The applications 308 also can include instructions used to operate the navigation server 106 and/or devices connected to the navigation server 106, if any. The instructions can include, for example, operating systems, firmware, drivers for peripherals, and the like. The applications 308 also can include, for example, authentication software, billing applications, user interface (UI) applications, usage tracking applications, and the like.

The other data 310 can include, for example, billing information, maps and navigation information, translation information, dictionaries, billing applications, account data, user device data, software, programs, algorithms, hardware data, and the like. The other data 310 also can include account/device data that relates to a user's account and/or to one or more devices 108. The account/device data can include, but is not limited to, the user's subscription plan, subscription features, and/or the capabilities of the user's device 108.

The navigation server 106 can be in communication with one or more billing platforms, and/or other network nodes, to receive the account/device data relating to a user's subscription plan, usage, and billing information. Additionally, the account/device data can inform the navigation server 106 of the features the user's device 108 supports by examining data relating to the device 108, for example, one or more of the IMSI or the IMEI, the serial number, a carrier, a software version(s), firmware information, one or more carrier-specific applications, combinations thereof, and the like. As such, the account device data can indicate if the device 108 supports WIFI®, 3G, 2G, EDGE, GPS, A-GPS, network triangulation, BLUETOOTH®, NFC, audible navigation instructions, web formats, audio formats, video formats, data transfer of audio files and video files, and the like. Additionally, the account/device data can indicate whether services for the device 108 are charged/billed on a pre-paid and/or post-paid basis, or if features are available on the device 108.

The account/device data can pass-through the navigation server 106, or can be stored, at least temporarily, by the navigation server 106. Additionally, billing, privacy, safety, and/or other concerns can be used to tailor functionality of the navigation server 106 through the account/device data. For example, a user can disable the functionality of the navigation server 106 and store a preference indicating disablement of the navigation server 106 as an account setting stored in the account/device data. Additionally, the navigation server 106 can use billing information to adjust functionality of the navigation server 106. For example, a notification can be sent from a billing platform to the navigation server 106 and the navigation server 106 can disable functionality automatically. A user can be given the ability to override deactivation of some, none, or all desired features and/or functionality of the navigation server 106.

The other data 310 also can include a billing module (not illustrated) that can be used to track, collect, and/or report activities of the navigation server 106 to a billing system at the navigation server 106, or elsewhere on the communications network 102 for billing purposes. It should be understood that if the navigation server 106 resides on one or more devices, the billing module can be a combination of hardware and software reside elsewhere on the communications network 102.

The billing module can track, for example, how much data is sent and received by the navigation server 106, and can report this information to a billing and/or charging system of the communications network 102, for example. Billing and/or charging can be pre-paid or post-paid. The functionality of the navigation server 106 can be charged on any desired basis, including, but not limited to, a per-use basis, as a flat fee, as part of service package, or the like.

As explained briefly above, the functionality of the navigation server 106, as well as other elements of the system 100, can reside on one or more devices such as, for example, the device 108. As such, it should be understood that some or all of the applications 308 and the other data 310 can be stored in a memory 204 of the device 108, for example, as the applications 208 of the device 108. Similarly, as mentioned above, some or all functionality of the applications 308 can be stored at, and/or performed by, one or more servers or other nodes on the communications network 102. Furthermore, the processor 302 can be the processor 202 of the device 108, or a node of the communications network 102. The network interface 300 can be a communications component 224 of the device 108, for example, a short range radio device, a transceiver, a receiver, a transmitter, antennae, or combinations thereof, or a connection at a server or other node of the communications network 102. The functionality of the location server 104 can be provided by the location component 242 of the device 108, and the data stored as/by the MNN 110 can be stored as the navigation data 206 of the device 108.

Figure 4:
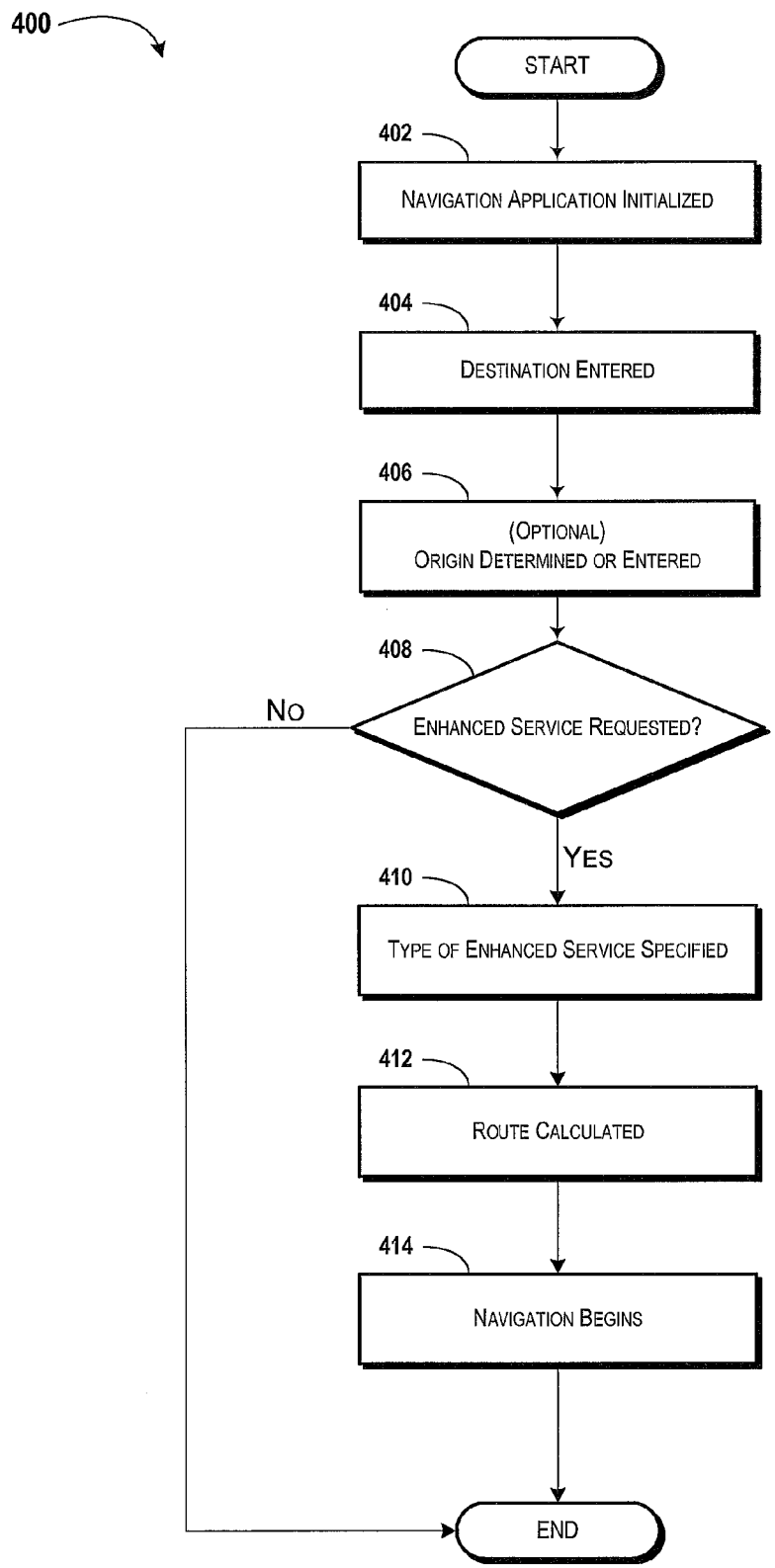
FIG. 4 schematically illustrates a method for providing enhanced navigation services at a device, according to an exemplary embodiment of the present disclosure.

FIG. 4 schematically illustrates a method 400 for providing enhanced navigation services for a device, according to an exemplary embodiment of the present disclosure. It should be understood that the steps of the method 400 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 400 can be ended at any time. Some or all steps of this process, and/or substantially equivalent steps, can be performed by execution of computer-readable instructions included on a computer readable medium.

The method 400 begins, and flow proceeds to block 402, wherein a navigation session is initialized at a device. For purposes of illustration, and not limitation, the navigation session can be initialized at the device 108, which can be operating on a cellular network. In some embodiments, the device 108 relies upon data transferred by the cellular network to provide navigation services. In some embodiments, the device 108 includes a GPS receiver and navigation and map data, and the device 108 can provide navigation without access to a cellular network.

At block 404, a destination can be received by the navigation application. For example, the destination can be entered at the device 108 and passed to the navigation application. The navigation application can run at the device 108, at the navigation server 106, and/or at another node of the communications network 102. The destination can be entered using text entry, selecting a contact from a contacts list, selecting an address from a web site, and the like. At optional block 406, an origin can be entered and/or determined at the device 108, at the navigation server 106, at the location server 104, at the other devices and networks 112, and/or another node of the communications network 102, and can be passed to the navigation application. In some embodiments, a navigation application is run on a device 108 that includes a GPS receiver. As such, the GPS receiver of the device 108 can determine the location of the device 108 using GPS technology, if desired.

At block 408, a determination can be made as to whether enhanced navigation services should be used. Enhanced navigation services can include providing navigation via hiking trails, bicycle paths, rapid transit systems, utility easements, public parks, amusement parks, sidewalks, waterways, building interiors such as, libraries, malls, and museums, and/or other routes, and the like, instead of, or in addition to, providing navigation via roads, streets, highways, and the like. Enhanced navigation services also can include translation and notification functions, as will be explained in more detail below. The determination as to whether or not one wants to use enhanced navigation services can be made by prompting a user for input, for example, by asking a user to select whether or not he or she wants to use enhanced navigation services. Additionally, or alternatively, a user can store a preference in a device setting and/or account setting associated with a navigation application. The preference can be stored at the device 108, the navigation server 106, or elsewhere on the communications network 102, and can be communicated to the navigation application.

If it is determined that enhanced navigation services are to be used, flow can proceed to block 410, whereat the type of enhanced navigation services to be used can be specified. A user can be prompted to select or otherwise indicate which enhanced navigation services he or she wishes to use. Additionally, or alternatively, the user can customize device settings and/or account settings that indicate the user's preferences with respect to which enhanced navigation services the user wishes to use. As such, the determining step illustrated at block 410 can include retrieving the user's account and/or device settings from preferences and/or settings stored at the device 108, the navigation server 106, and/or other nodes of the communications network 102.

At block 412, the navigation application can calculate a route to the destination. The route can be calculated from the current location of the device 108 or from an entered origin, for example. In some embodiments, the route is updated as the device 108 moves along the route.

In some embodiments, as explained above, the enhanced navigation services include using rapid transit maps and information during calculation of the route. For example, a route can be calculated that makes use of rapid transit routes, schedules, average transit times, and the like. The route can include turns and instructions relating to bus, train, subway, and/or other rapid/public transit schedules, as well as rapid/public transit stops, transit times, transit schedules, combinations thereof, and the like. Enhanced navigation services including rapid transit maps can be helpful for those living in urban areas since many urban users use public transportation more than private transportation means. Routes calculated using rapid/public transit maps and information can provide a user with turn-by-turn instructions including train stops, expected arrival times, expected transit times, and the like. As will be explained in more detail below, navigation applications also can provide notifications relating to approaching stops, and the like. The calculated routes can also include instructions for use of non-surface-street routes such as, for example, walkways, hiking trails, bicycle trails, utility easements, waterways, and the like.

In some embodiments, the enhanced navigation services can include translation of maps, map information, and navigation information. For example, a user who is traveling in a foreign country may be unable to read and/or understand rapid transit stop names. The navigation application can determine that the device is in a foreign country by receiving data that indicates the city and/or country in which the device 108 is located, a local network, satellites used to provide GPS information, or other methods.

In a foreign country, a user who does not understand the local language may be unaware that his or her stop is approaching. According to some embodiments, the navigation application can translate into a designated language, stop names, maps, map instructions, navigation instructions, notifications, and the like. As such, a user can be prompted in his or her preferred and/or native language that a stop is approaching. The notification can include pronunciation keys, if desired. The translation and notification features will be described in more detail below with reference to FIGS. 5 and 7.

As illustrated at block 414, navigation can begin. During navigation, the navigation application can update the location of the device 108, and can display route information for the user. For example, the device 108 can display the distance and time traveled, the distance and time to the next turn, the distance and time to the destination, the current bearing, the current speed, local attractions, statistics, other information, and the like. If navigation includes the use of rapid/public transit, the navigation application can make use of location beacons that are located on the train, bus, subway, boat, or the like, to provide turn information where GPS signals or other location information is not available. The method 400 can end.

Returning briefly to block 408, if the navigation application determines that enhanced navigation services are not to be used for the current route, the method 400 can end without additional steps, and more traditional navigation routing and navigation can occur without the use of enhanced navigation services.

Figure 5:
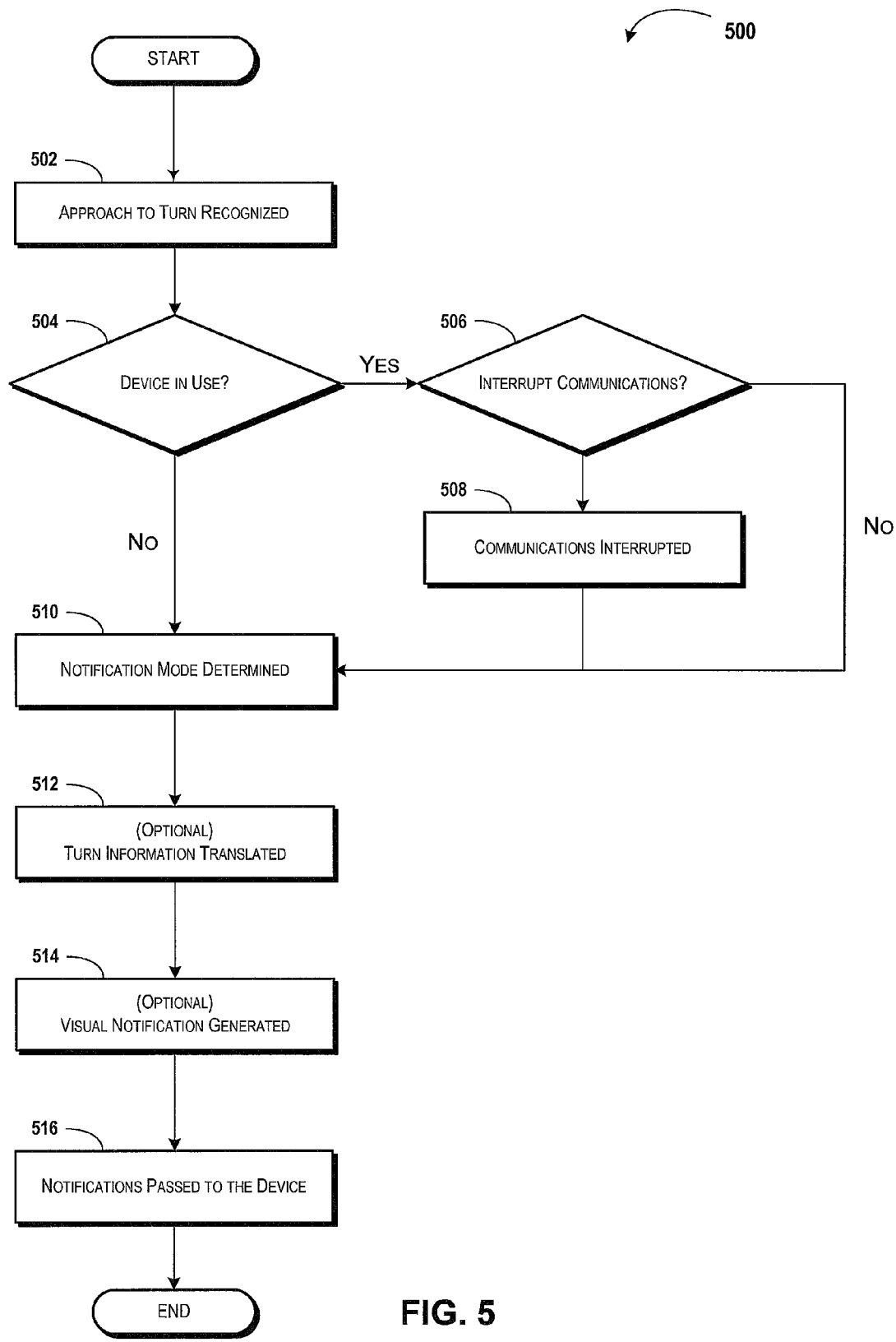
FIG. 5 schematically illustrates a method for providing a notification to a user of a device engaged in an enhanced navigation session, according to an alternative exemplary embodiment of the present disclosure.

FIG. 5 schematically illustrates a method 500 for providing a notification to a user of a device engaged in an enhanced navigation session, according to an exemplary embodiment of the present disclosure. It should be understood that the steps described are not necessarily presented in any particular order and performance of some or all the steps in an alternative order(s) is possible and is contemplated. The steps have been presented in the demonstrated order for ease of description and illustration. Steps can be added, omitted and/or performed simultaneously without departing from the scope of the appended claims. Some or all steps of this process, and/or substantially equivalent steps, can be performed by execution of computer-readable instructions included on a computer readable medium.

The method 500 begins, and flow proceeds to block 502, wherein a navigation application recognizes that the device 108 is approaching a turn. For purposes of this description and the claims, it should be understood that the term "turn" can include a final destination, a train or bus stop, a street name change, a mode of transportation change, combinations thereof, and the like, and is not limited to a bend or change of direction. The navigation application can recognize that the device 108 is approaching a turn by recognizing that the device 108 has entered into proximity with a turn ("turn proximity"). The turn proximity can be defined in terms of time and/or distance. In some embodiments, the turn proximity is defined as 10 seconds, 15 seconds, 30 seconds, one minute, or another time measure. In some embodiments, the turn proximity is defined as 0.1 miles, 0.25 miles, 0.5 miles, 1.0 miles, 100 meters, 500 meters, 1000 meters, or another distance measure.

At block 504, the navigation application can determine if the device 108 is in use for voice, data, or other communications. For example, the navigation application can recognize that the device 108 is currently engaged in a data and/or voice session by, for example, monitoring activity of the device 108, a node of the communications network 102, or another device.

If the navigation application determines that the device 108 is in use, the method 500 can proceed to optional block 506, whereat the navigation application can determine if the navigation application should interrupt any communications occurring at the device 108 to provide the notifications. For example, the navigation application can determine that communications must be interrupted to provide certain notifications. Additionally, or alternatively, the navigation application can determine that preferences associated with the device 108 allow the navigation application to interrupt communications to provide notifications. Alternatively, the navigation application can determine that the notifications can be provided without interrupting communications.

If the navigation application determines to interrupt the communications occurring at the device 108, then the method 500 can proceed to block 508, whereat the navigation application can interrupt communications at the device 108. In some embodiments, the navigation application can use an audio I/O component 232 of the device 108 to pass the notification to the user. The signal being provided to/by the audio I/O component 232 can be temporarily interrupted and replaced with the notification audio signal. Similarly, a data stream can be interrupted to provide the notification via a data transfer. In some embodiments, the navigation application operates on a cellular network, and the navigation application can pause data, voice, audio, or other information transfer to allow passage of a notification to the user as a data file, a phone call, an email, an SMS message, a warning signal, combinations thereof, and the like.

In some embodiments, the navigation application can determine not to interrupt communications at the device 108. Instead, the navigation application can pass the notifications to the device 108 by supplementing the communications already occurring at the device 108, or by using a mode of notification that can occur simultaneously with other communications at the device 108. If, at block 506, the navigation application determines it should not interrupt communications, the method can proceed to block 510. Similarly, if, at block 504, the navigation determines that the device 108 is not currently in use, the method 500 can proceed to block 510.

At block 510, the navigation application can determine a notification mode to use. The navigation application can be configured by a network operator, by a device manufacturer, by an application author, by a user setting or preference, or the like, to use particular types of notifications in certain circumstances, locations, and the like. In the case of user settings and/or preferences, for example, a user can specify that he or she prefers visual, tactile, and/or audio notifications. The user can also specify preferred types and/or modes of providing the preferred types of notifications. For example, a user may specify that he or she prefers emails, SMS messages, phone calls, vibration alerts, and the like. Such preferences can be retrieved by the navigation application and used to determine notification modes.

At optional block 512, the navigation application can obtain a translation of the turn information. For example, the navigation application can access a translation module that is in communication with the navigation application, the device 108, the navigation server 106, or the communications network 102. In some embodiments, the memory 204 of the device 108 includes a translation module. In some embodiments, the memory 306 of the navigation server 106 includes a translation module. In some embodiments, the translation node is, for example, a server operating on the Internet, a cellular network, or elsewhere on the communications network 102. The navigation application can pass turn information to the translation module, and the translation module can generate a translation and/or a pronunciation key relating to the turn information. For purposes of this description and the claims, the phrase "pronunciation key" refers to translations and transliterations of words, as well as keys, soft keys, or regions of a touch-sensitive screen, that can be pressed to play an audio file of the word being pronounced. The translation and pronunciation key functions of the present disclosure can allow presentation of turn information in a user's native or designated language, to enable a user to recognize their turn.

At optional block 514, the navigation application can generate a visual notification. The navigation application can create and/or format an image, a video, and/or text for display at the device 108. Additionally, or alternatively, the navigation application can instruct the device 108 to activate the LED 222 of the device 108 to provide visual notifications at the device 108. The navigation application also can display the image, video, and/or text.

In some embodiments, the navigation application can generate an image and/or text that includes translations and/or pronunciation keys for foreign names or travel information. Additionally, a visual notification can include estimated time and distance measures from the origin, to turns, to destinations, and combinations thereof, if desired. An example of an exemplary visual notification that includes an image and/or text that includes translations and pronunciations for foreign names will be described below with reference to FIG. 7.

At block 516, the notifications can be passed to the device 108. The device 108 can provide the notifications to the user.

Figure 7:
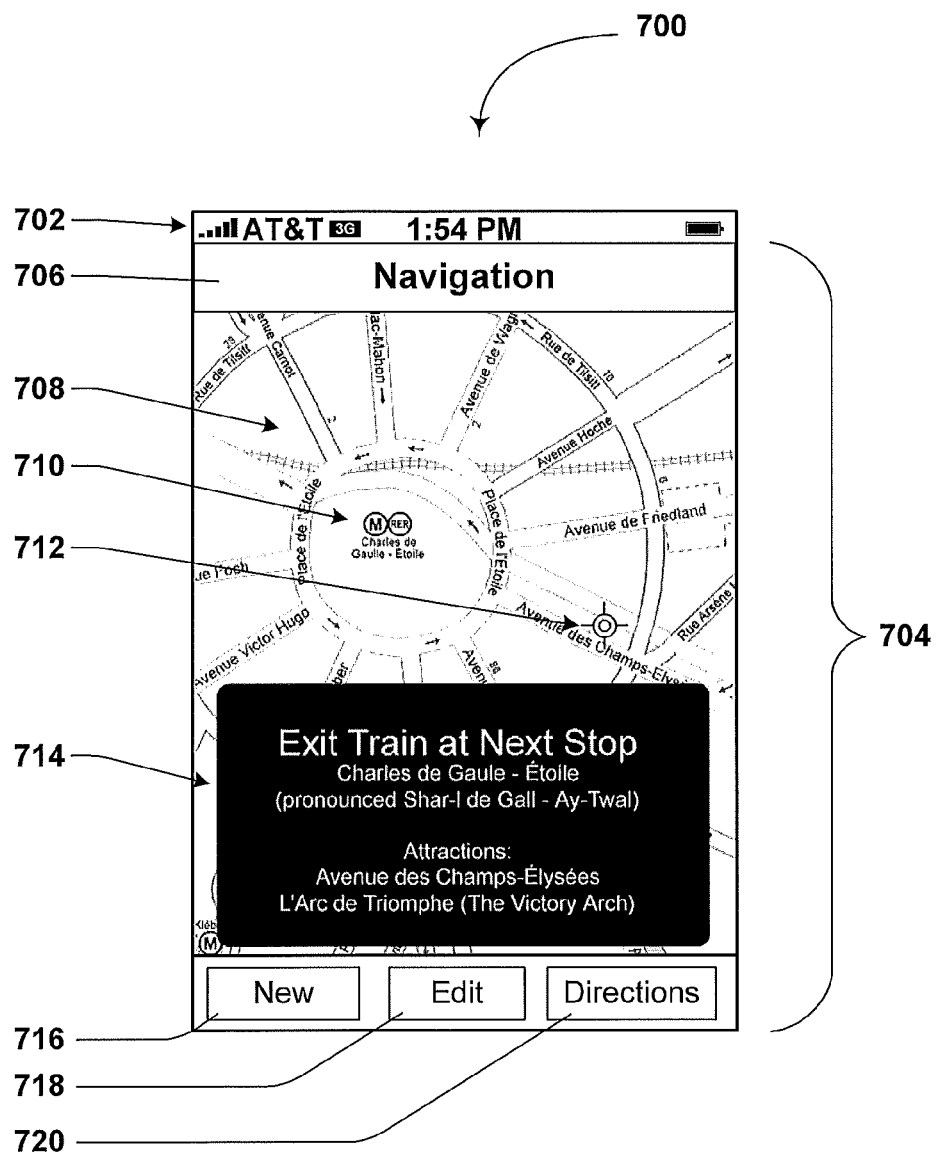
FIG. 7 illustrates a GUI for providing a navigation application interface, according to another exemplary embodiment of the present disclosure.

In some embodiments, the navigation application uses the rapid/public transit, translation, and notification functions together to provide travel information relating to a transit route to a user in his or her designated language. An exemplary embodiment of an application of these features is illustrated in FIG. 7. As such, a user using a device 108 can navigate to a desired location using a navigation application. The user can use the device 108 for voice and/or data communications during navigation. When the device 108 recognizes that it is within a turn proximity, the navigation application can interrupt data and/or voice communications at the device 108 to provide a notification.

The notification can include, for example, activation of an audio I/O component 232 of the device 108, for output of an audio signal. For example, a signal could be passed to the ringer of the device 108, to an external speaker of the device 108, to an earpiece speaker of the device 108, combinations thereof, and the like. The notification also can include activation of a vibrating alert 220 of the device 108 to provide a tactile notification. Use of the vibrating alert 220 can be useful in loud environments, for users with diminished hearing ability, when the device 108 is in a carrying bag or pouch, and the like. The vibrating alert 220 can used instead of, or in conjunction with, an audio I/O component 232. The notification also can include an image, video, and/or text displayed by one or more displays 200 of the device 108 to provide a visual notification. The display 200 can be used instead of, or in conjunction with, the vibrating alert 220 and/or the audio I/O component 232. The notification also can include activation of an LED 222 of the device 108 to provide additional or alternative visual notifications. The LED 222 can be used instead of, or in conjunction with, the display 200, the vibrating alert 220, and/or the audio I/O component 232. The method 500 can end.

Figure 6:
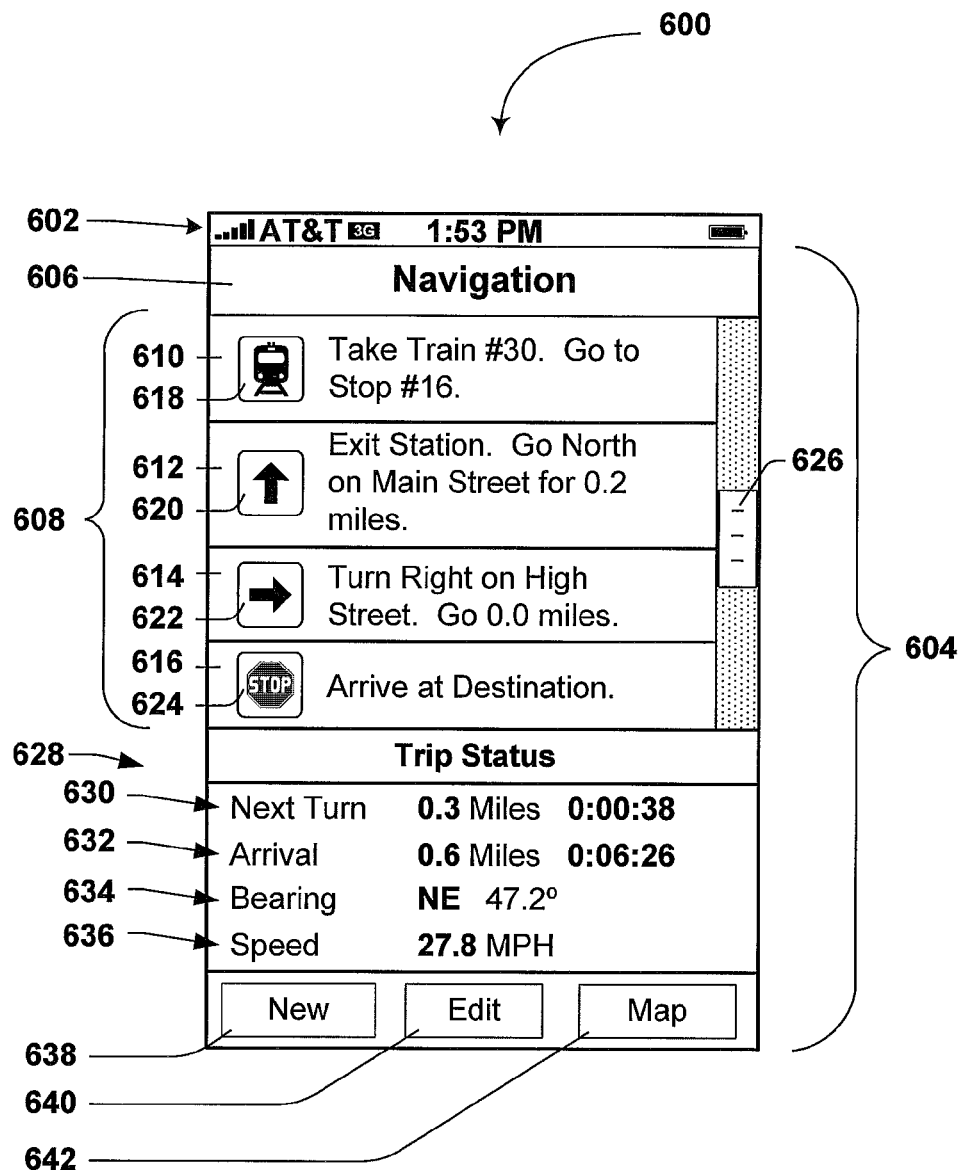
FIG. 6 illustrates a graphical user interface (GUI) for providing a navigation application interface, according to an exemplary embodiment of the present disclosure.

FIG. 6 illustrates an exemplary GUI 600 for a device 108, according to an exemplary embodiment of the disclosure. In some embodiments, the GUI 600 is displayed by a video output source on a display 200 of a device 108. As illustrated, the GUI 600 can include operational information 602 for the device 108. The operational information 602 can include network information, for example, a signal meter for displaying the measured strength of a network signal, and information relating to the network with which the device 108 is in communication. In the illustrated GUI 600, the device 108 is indicating maximum signal strength and that the device 108 is currently connected to the AT&T third generation (3G) network. This indication is exemplary only, and the GUI 600 can be used on devices operating on other networks, other protocols, other standards, and/or operated by other carriers. The operational information 602 also can include, for example, the time of day, GPS satellite information, a date, a message waiting indicator, a battery meter, a short range radio communications device indicator, an alarm indicator, other information, and the like.

The GUI 600 includes a navigation interface 604 for viewing navigation information. The navigation interface 604 can include a title portion 606 for indicating to a user the function currently being performed by the device 108. The navigation interface 604 can include turn-by-turn directions 608 for providing a user with easily read turning directions. It should be understood that the navigation interface 604 also can display a map instead of, or in addition to, the turn-by-turn directions 608.

The turn-by-turn directions 608 are illustrated as including turns 610, 612, 614, 616, quick reference icons 618, 620, 622, 624, and a scroll bar 626. The scroll bar 626 can allow a user to "scroll" up and down through the turn-by-turn directions 608. Although not illustrated in FIG. 6, the navigation interface 604 can include scroll bars for "scrolling" right and left as well as, or instead of, the illustrated scroll bar 626.

The navigation interface 604 also can include a trip status area 628. The trip status area 628 can provide various types of navigation information for the user. For example, the trip status area 628 can provide an indication 630 of how far and how long it is to the next turn, an indication 632 of how far and how long it is to the destination, an indication 634 of the current bearing, an indication 636 of the current speed, an indication (not illustrated) of how far and how long the user has traveled, additional and/or alternative indications (not illustrated), combinations thereof, and the like. It should be understood that the illustrated indications 630, 632, 634, 636 are exemplary only. Additional and/or alternative options are possible and contemplated.

The GUI 600 also can include various options, for example, an option 638 to create a new route, an option 640 to edit the current route, an option 642 to view a map, an option (not illustrated) to exit the navigation application, additional and/or alternative options (not illustrated), combinations thereof, and the like. It should be understood that the illustrated options 638, 640, 642 are exemplary only. Additional and/or alternative options are possible and contemplated. Although not illustrated, for example, the current leg of the route can be highlighted, or otherwise indicated, if desired.

FIG. 7 illustrates a GUI 700 for a device 108, according to another exemplary embodiment of the disclosure. In some embodiments, the GUI 700 is displayed by a video output source on a display 200 of a device 108. As illustrated, the GUI 700 can include operational information 702 for the device 108, as described above with reference to FIG. 6. The GUI 700 can include a navigation interface 704 for providing navigation services for a user. The navigation interface 704 can include a title portion 706 for indicating to a user the function currently being performed by the device 108. In the illustrated embodiment, the title portion 706 informs the user that the GUI 700 is currently displaying a navigation service.

As discussed briefly above, the illustrated GUI 700 can display a map 708. The map 708 can include a destination 710 and a current position 712. In the illustrated embodiment, the user is using the navigation application to visit the Arc de Triomphe in Paris, France. As illustrated in the exemplary embodiment, the navigation application is being used on the RER train of the Métro de Paris, the Paris Métro. Since much of the Paris Métro is underground, the device 108 can be accessing location beacons to determine and display the current position 712. The navigation application is displaying a visual notification 714 that informs the user that the next turn is approaching. In the illustrated embodiment, the visual notification 714 informs the user that he or she should exit the train at the next stop. The illustrated visual notification 714 includes a translation and/or a pronunciation key to assist the user with identifying the next turn in a language understood and recognized by the user. The visual notification 714 can be displayed by the device during other voice and/or data communications. Although the visual notification 714 is illustrated as a combination of image and text data, it should be understood that the visual notification 714 could be text such as, for example, an SMS message, an email message, or the like.

The navigation interface 704 can include an option 716 to create a new route, an option 718 to edit a route, an option 720 to view turn-by-turn directions, additional and/or alternative options, combinations thereof, and the like. The illustrated labels are exemplary only.

Although embodiments of the present disclosure have been described with reference to GPS technologies, it should be understood that non-GPS location data can be used as well. For example, when a device 108 is unable to receive GPS signals, the device 108 can rely upon other location data such as data transmitted by location beacons, location transmitters on trains, busses, ferries, and the like, cellular network radio signals, combinations thereof, and the like.

Although not described in detail above, other features are contemplated and can be included in the systems and methods described above. For example, some embodiments of the navigation application can generate information relating to rapid transit systems. For example, the navigation application can display train or bus route numbers, vehicle and/or route colors, the closest stop or station to the current location of the device 108, and/or the number of stops to the destination and/or a turn. These and other data relating to the route, the position of the device 108, and/or the estimated time to arrival can be appended to a message and transmitted to another party as, or with, a message. In some embodiments, the message can be sent as a text message, as an email, as an MMS message, as a voicemail message, or the like. Additionally, or alternatively, optimal routes can be calculated based upon various data, including, but not limited to, rapid transit schedules, traffic conditions, road construction, and the like, all of which can be taken into account during calculation of a navigation route.

It will be appreciated that the notification features can be used to allow users to multi-task while using public transit, for example. A user can engage in cellular voice and/or data sessions with the device 108, but still receive a notification when a destination, stop, or turn is approaching, as explained above in detail. This can help relieve the user from paying close attention to route progress, particularly in foreign countries where the user may not be familiar with the language of the map and/or announcements provided to the user.

Similarly, some embodiments of the present disclosure include voice recognition and voice emulation functionality. The device 108 can be configured to recognize voice commands and control device functions according to the commands. In some embodiments, the device 108 also includes the ability to provide audible turn-by-turn instructions and notifications. Voice recognition and audible navigation instructions can be used to assist users with impaired vision and/or reading ability, as well as users engaged in activities that require full attention such as, for example, driving. Additionally, it will be appreciated that some users, e.g., users with impaired vision or reading skills, of the navigation services described above could benefit from spoken directions, or other audible notifications.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A system, for providing a notification message for an enhanced level of navigational services to a user of a mobile device, comprising:
    a processor; and
    a memory being in operative communication with the processor and having stored thereon computer-executable instructions that, when executed by the processor, cause the processor to perform operations comprising:
    generating the notification message for presentation to the user of the mobile device;
    prompting the user for determining whether to provide the enhanced level of navigation services; and
    in response to determining that the user would like the enhanced level of navigation services:
        determining that the mobile device is within a proximity of a turn;
        determining that the mobile device is engaged in a communication with an other device;
        identifying a user-created preference indicating whether the user would like communications interrupted for delivery of messages;
        selecting a notification mode, from a group of notification modes, for providing the notification message to the user based on a present circumstance, related to the user, other than a present location of the mobile device, yielding a presently-selected notification mode;
        initiating interruption of the communication, in order to provide the notification message to the user, in response to determining that the mobile device is within proximity of the turn and in response to identifying the user-created preference indicating that communications should be interrupted for delivery of messages; and
        initiating provision of the notification message to the user by way of the presently-selected notification mode.

2. The system of claim 1, wherein the computer-executable instructions, when executed by the processor, cause the processor to perform the operations further comprising generating first instructions to interrupt the communication for providing the notification message for the enhanced level of navigational services to the user of the mobile device.

3. The system of claim 2, wherein the computer-executable instructions that, when executed by the processor, cause the processor to perform the operation of generating the notification message for the enhanced level of navigational services, cause the processor to provide, in the message, information translated from a first language to a second language.

4. The system of claim 2, wherein the computer-executable instructions that, when executed by the processor, cause the processor to perform the operation of generating the notification message for the enhanced level of navigational services, cause the processor to provide, in the notification message, a pronunciation key for indicating pronunciation of at least one word associated with the message.

5. The system of claim 1, further comprising a location determination device, for use in determining the location of the mobile device, including a location component of the mobile device.

6. The system of claim 1, further comprising a location determination device, for use in determining the location of the mobile device, including a location server of a communications network.

7. The system of claim 1, wherein:
    the computer-executable instructions, when executed by the processor, cause the processor to perform the operations further comprising accessing maps and navigation information, wherein the maps and navigational information comprises data indicating routes, schedules, and transit times for at least one public transit vehicle; and
    the notification message, for the enhanced level of navigational services, comprises the map and navigation information.

8. The system of claim 1, wherein:
    the computer-executable instructions, when executed by the processor, cause the processor to perform the operations further comprising accessing maps and navigation information, wherein the maps and navigational information comprises data indicating a route for at least one utility;
    wherein the notification message, for the enhanced level of navigational services, includes the map and navigation information.

9. The system of claim 8, wherein:
    the computer-executable instructions, when executed by the processor, cause the processor to perform the operations further comprising accessing maps and navigation information, wherein the maps and navigational information comprises data indicating:
    a rapid transit route;
    a rapid transit schedule; and
    a rapid transit stop; and
    the notification message, for the enhanced level of navigational services, includes the map and navigation information.

10. The system of claim 1, wherein the computer-executable instructions that, when executed by the processor, cause the processor to:
    generate the notification message, cause the processor to generate the notification message, being a navigation message including navigation information;
    identify the user-created preference indicating whether the user would like communications interrupted for delivery of notification messages, cause the processor to identify the user-created preference indicating whether the user would like communications interrupted for delivery of navigation messages; and
    initiate interruption of the communication, in order to provide the notification message to the user, in response to determining that the mobile device is within proximity of the turn and in response to determining that the user-created preference indicates that communications should be interrupted for delivery of notification messages, cause the processor to initiate interruption of the communication, in order to provide the navigation message to the user, in response to determining that the mobile device is within proximity of the turn and in response to determining that the user-created preference indicates that communications should be interrupted for delivery of navigation messages.

11. A method, for providing a notification message, for an enhanced level of navigational services, to a user of a mobile device, comprising:
prompting a user of the mobile device for determining whether to provide the enhanced level of navigation services; and
in response to determining that the user would like the enhanced level of navigation services:
determining, by a processor, that the mobile device is within a proximity of a turn;
generating, by the processor, the notification message for the presentation to a user of the mobile device;
determining that the mobile device is engaged in communications with an other device;
determining if communications at the mobile device should be interrupted to provide the notification message;
identifying a user-created preference indicating whether the user would like communications interrupted for delivery of notification messages;
selecting a notification mode, from a group of notification modes, for providing the notification message to the user based on a present circumstance, related to the user, other than a present location of the mobile device, yielding a presently-selected notification mode;
initiating interruption of the communication, in order to present the notification message to the user, in response to determining that the mobile device is within proximity of the turn and in response to identifying the user-created preference indicating that communications should be interrupted for delivery of notification messages; and
initiating provision of the notification message to the user by way of the presently-selected notification mode.

12. The method of claim 11, wherein generating the notification message further comprises providing, in the notification message, information translated from a first language to a second language.

13. The method of claim 12, wherein generating the notification message further comprises providing, in the notification message, a pronunciation key for indicating pronunciation of at least one word associated with the information.

14. The method of claim 11, wherein generating the notification message further comprises generating a visual notification.

15. The method of claim 11, wherein generating the notification message further comprises generating an audio notification message.

16. The method of claim 11, further comprising transmitting the notification message to one or more components of the mobile device.

17. The method of claim 11, wherein:
generating the notification message comprises generating the notification message in the form of a navigation message for presentation to a user of the mobile device, the navigation message including navigation information;
identifying the user-created preference indicating whether the user would like communications interrupted for delivery of navigation messages comprises identifying the user-created preference indicating whether the user would like communications interrupted for delivery of navigation messages; and
initiating interruption of the communication, in order to present the navigation message to the user, in response to determining that the mobile device is within proximity of the turn and in response to determining that the user-created preference indicates that communications should be interrupted for delivery of navigation messages comprises initiating interruption of the communication, in order to present the navigation message to the user, in response to determining that the mobile device is within proximity of the turn and in response to determining that the user-created preference indicates that communications should be interrupted for delivery of navigation messages.

18. A mobile device comprising:
a processor; and
a memory in communication with the processor and a location determination device, the memory having stored thereto computer-executable instructions that, when executed by the processor, cause the processor to perform operations comprising:
prompting the user for determining whether to provide an enhanced level of navigation services;
receiving a preference from the user indicating whether the user would like to receive communications interrupted for delivery of notification messages, to form a user-created preference; and
in response to determining that the user would like the enhanced level of navigation services:
receiving a notification message, for the enhanced level of navigational services, from a communication device remote to the mobile device and in a communication network;
identifying the user-created preference indicating whether the user would like communications interrupted for delivery of notification messages;
selecting a notification mode, from a group of notification modes, for providing the notification message to the user based on a present circumstance, related to the user, other than a present location of the mobile device, yielding a presently-selected notification mode;
interrupting an existing communication in order to present the notification message to the user in response to a determination having been made that the mobile device is within proximity of a turn and in response to a determination having been made that the user-created preference indicating that communications should be interrupted for delivery of notification messages; and
initiating provision of the notification message to the user by way of the presently-selected notification mode.

19. The mobile device of claim 18, wherein the computer-executable instructions, when executed by the processor, cause the processor to perform the operations further comprising:
recognizing recognize received instructions as instructions to interrupt communications at the mobile device to provide the notification message, the instructions having been generated in response to the determination that the user-created preference indicates that communications should be interrupted for delivery of notification messages in the form of navigation messages; and interrupting the existing communication in response to receiving the received instructions.

20. The mobile device of claim 19, wherein the computer-executable instructions that, when executed by the processor, cause the processor to generate the notification message, cause the processor to provide, in the notification message, the navigation information translated from a first language to a second language.

21. The mobile device of claim 19, wherein the computer-executable instructions that, when executed by the processor, cause the processor to generate the notification message, cause the processor to provide, in the notification message, a pronunciation key for indicating pronunciation of at least one word associated with the navigation information.

22. The mobile device of claim 18, wherein;
the computer-executable instructions, when executed by the processor, cause the processor to perform the operations further comprising determining location using the location determination device; and
the location determination device is a component of the mobile device.

23. The mobile device of claim 18, wherein:
the computer-executable instructions, when executed by the processor, cause the processor to perform the operations further comprising determining location using the location determination device; and
the location determination device includes a location server of the network, being a cellular network.

24. The mobile device of claim 18, wherein the computer-executable instructions, when executed by the processor, cause the processor to perform the operations further comprising accessing maps and navigation information, wherein the maps and navigational information comprises data indicating routes, schedules, and transit times for at least one public transit vehicle.

25. The mobile device of claim 18, wherein the computer-executable instructions, when executed by the processor, cause the processor to perform the operations further comprising accessing maps and navigation information, wherein the maps and navigational information comprises data indicating:

a rapid transit routes;
a rapid transit schedule; and
a rapid transit stop.

26. The mobile device of claim 18, wherein the computer-executable instructions that, when executed by the processor, cause the processor to:
receive a preference from the user indicating whether the user would like communications interrupted for delivery of notification messages, to form a user-created preference, cause the processor to receive the preference from the user indicating whether the user would like communications interrupted for delivery of navigation messages;
to receive a notification message, causes the processor to receive the notification message in the form of a navigation message;
identify the user-created preference indicating whether the user would like communications interrupted for delivery of notification messages, cause the processor to identify the user-created preference indicating whether the user would like communications interrupted for delivery of navigation messages; and
interrupt an existing communication in order to present the notification message to the user, the notification message having been sent to the mobile device in response to a determination having been made that the mobile device is within proximity of a turn and in response to a determination having been made that the user-created preference indicates that communications should be interrupted for delivery of notification messages, cause the processor to interrupt an existing communication in order to present the navigation message to the user, the navigation message having been sent to the mobile device in response to a determination having been made that the mobile device is within proximity of a turn and in response to a determination having been made that the user-created preference indicates that communications should be interrupted for delivery of navigation messages.

\* \* \* \* \*